July 2, 1929.  W. L. FODREA  1,719,326
SUPPORT FOR MOTOR VEHICLE ENGINES
Filed May 12, 1927   7 Sheets-Sheet 1

Inventor
W. F. FODREA

By
Attorney

July 2, 1929.　　　W. L. FODREA　　　1,719,326

SUPPORT FOR MOTOR VEHICLE ENGINES

Filed May 12, 1927　　　7 Sheets-Sheet 4

Inventor
W. L. FODREA

Attorney

July 2, 1929.    W. L. FODREA    1,719,326
SUPPORT FOR MOTOR VEHICLE ENGINES
Filed May 12, 1927    7 Sheets-Sheet 5

Inventor
W. F. FODREA
By
Attorney

July 2, 1929.     W. L. FODREA     1,719,326
SUPPORT FOR MOTOR VEHICLE ENGINES Filed May 12, 1927     7 Sheets-Sheet 7

Inventor
W. L. FODREA

By
Attorney

Patented July 2, 1929.

1,719,326

UNITED STATES PATENT OFFICE.

WILLIAM L. FODREA, OF LITTLE ROCK, ARKANSAS, ASSIGNOR TO FODREA PLANETARY MOTOR COMPANY, OF LITTLE ROCK, ARKANSAS, A CORPORATION OF ARKANSAS.

SUPPORT FOR MOTOR-VEHICLE ENGINES.

Application filed May 12, 1927. Serial No. 190,956.

This invention relates to supports for motor vehicle engines, and more particularly to a support of a novel character which is adapted to permit a motor vehicle engine to be swung to an inverted position to permit work to be performed on the parts of the engine which are normally arranged at the bottom thereof, such as the crank shaft and associated elements.

It is the usual practice in performing repair operations on motor vehicle engines which requires access to the crank shaft of an engine and associated elements, to remove the lower portion of the crank case, and this work must be performed by a mechanic working beneath the vehicle. It is very difficult to perform this work due to the inaccessibility of the parts, lack of light and the limited space in which the mechanic must work. Accordingly it is an important object of the present invention to provide novel means for supporting a motor vehicle engine whereby it may be inverted in the frame of the vehicle to permit ready access to the crank case whereby the latter may be removed to permit work to be done on the crank shaft and associated parts.

A further object is to provide novel supporting means which is adapted to permit the engine to be inverted, means being provided for clamping the engine in normal position during operation thereof.

A further object is to provide novel means for supporting engines of the overhead valve type, which are relatively tall, whereby these engines may be elevated at the same time they are turned to permit the engine to clear the side frame members as it is being inverted.

The space between the side frames of a motor vehicle is usually less than the height of some engines, such as overhead valve engines, and accordingly it is a further object of the present invention to provide a novel form of planetary gearing arranged to cooperate with the frame and engine in such a manner that the crank case of the engine is elevated to a considerable extent during the initial turning operation whereby the engine may be completely inverted in the frame.

A further object is to provide novel means whereby the power of the starting motor may be utilized for effecting the inverting action.

A further object is to provide means for preventing the oil in the crank case of the engine from leaking into the cylinder heads when the engine is inverted.

A further object is to provide an auxiliary oil container normally communicating with the crank case of the engine above the level of the oil therein, the auxiliary container being so arranged that oil in the crank case will flow thereinto and will be retained therein as the engine is inverted whereby the oil will be prevented from leaking past the pistons of the engine into the cylinder heads.

Other objects and advantages of the invention will become apparent during the course of the following description.

In the drawings I have shown several embodiments of the invention. In this showing:

Figure 5 is an enlarged sectional view taken substantially on line 5—5 of Figure 3, Figure 6 is a detail section on line 6—6 of Figure 3, Figures 7 to 14 inclusive are diagrammatic end views indicating the engine in various positions during its turning movement.

Referring to the drawings the numeral 10 designates the side frame members of an automobile chassis mounted upon forward and rear wheels 11 and 12 respectively and adapted to be driven by a motor 13. In the form of the invention illustrated in Figures 1 to 14 inclusive, the motor is of the overhead valve type, such a motor usually being of such a height as to prevent it to be rotated about a fixed axis within the side frames 10. The motor may be provided with the usual water cooling system including in part a radiator 14. Power is delivered from the engine 13 in a manner to be described to the usual gear set 15 controlled by a gear shift lever 16, whereby power may be delivered to the rear wheels 12 through a propeller shaft 17.

Figure 1:
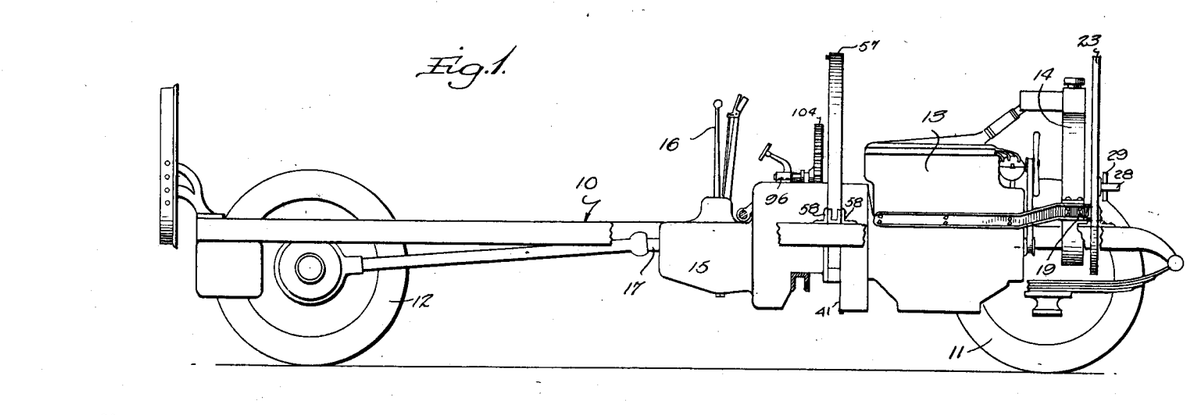
Figure 1 is a side elevation of the vehicle showing the invention applied, parts being omitted and broken away.
Figure 2:
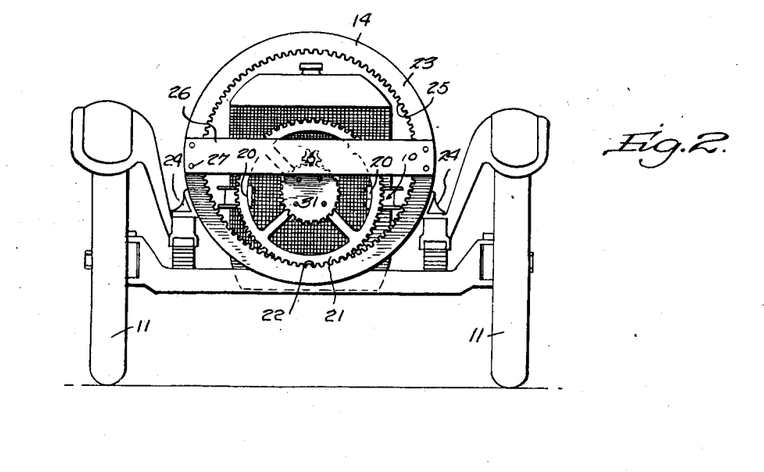
Figure 2 is a front elevation of the same.
Figure 3:
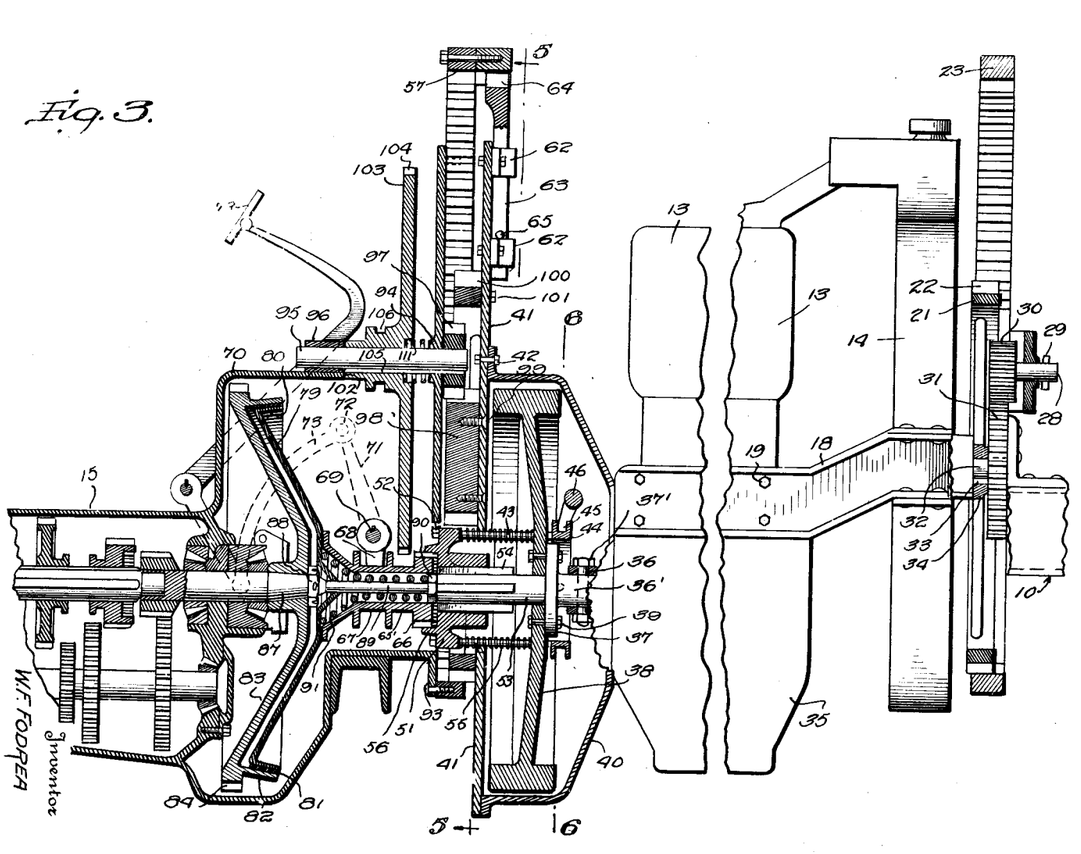
Figure 3 is an enlarged central vertical sectional view, parts being broken away, and parts being shown in elevation.
Figure 4:
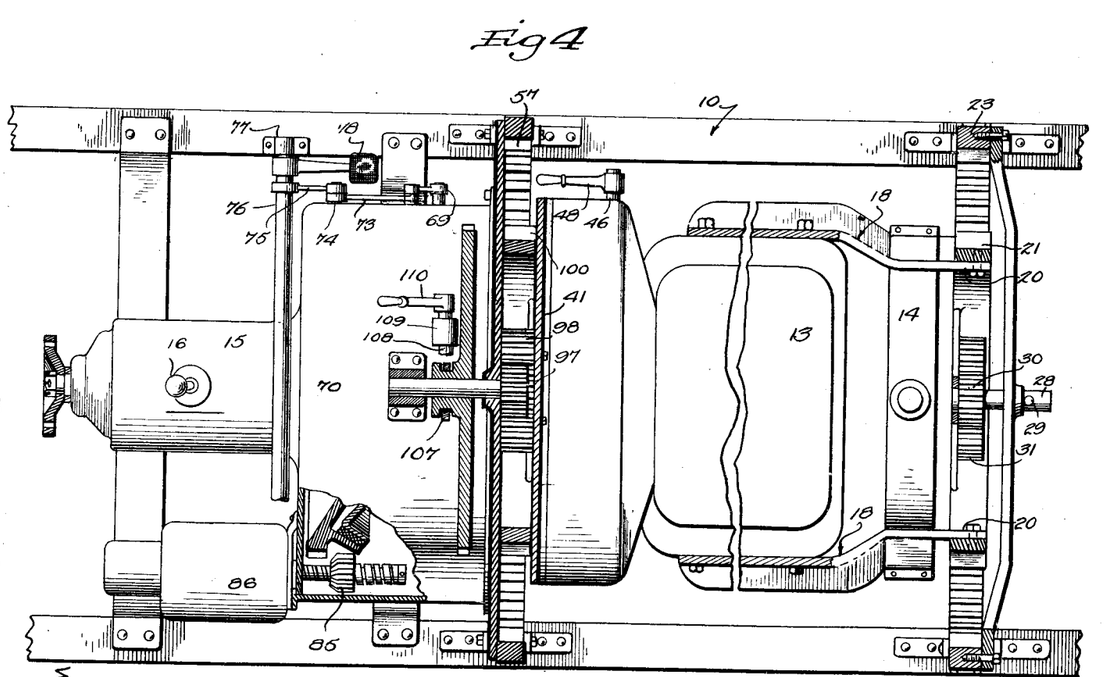
Figure 4 is a plan view, parts being shown in section.

Referring to Figures 1, 3 and 4, the numeral 18 designates a pair of side arms bolted to the sides of the motor as at 19 and projecting forwardly thereof. The side arms 18 are secured as at 19 to the radiator 14 whereby the latter may be supported in a fixed position with respect to the motor. The arms 18 project forwardly of the radiator and are secured as at 20 to a ring gear 21 having external teeth 22, for a purpose to be described. Means to be described are provided for rotating the motor of the vehicle, and it will be obvious that the motor, radiator, and ring gear 21, are fixed in their relative positions with respect to each other by the arms 18.

A relatively large ring gear 23 is secured by brackets 24 to the side frame members 10 and is provided internally with teeth 24 meshing with the teeth 22 of the ring gear 21. A cross bar 26 is secured to the ring gear 23 as at 27 and provides a bearing support for a stub shaft 28 having pins 29 or other suitable means adapted to be engaged by a suitable crank whereby the shaft 28 may be rotated for a purpose to be described. The shaft 28 is provided at its inner end with a pinion 30 which meshes with a gear 31. The gear 31 is provided with a stub shaft 32 which is keyed as at 33 to the hub 34 of the ring gear 21.

The motor 13 is provided with the usual crank case 35 in which the crank shaft 36 is arranged, the shaft being supported in suitable main bearings, as will be apparent. The crank shaft may be provided at its rear end with an extension 36' secured thereto by a bolt 37', and the extension 36' is provided with a flange 37 to which an ordinary fly wheel 38 may be bolted as at 39. The fly wheel 38 is rotatable in a housing 40 to which is secured a rear closure plate 41, the plate being bolted to the housing 40 as at 42.

A plurality of rods 43 are slidable on the fly wheel 38, these rods being arranged in a circle concentric with the crank shaft 36. Forwardly of the fly wheel the rods 43 are secured to a ring 44 having an annular groove 45 therein. A shaft 46 is journalled in the fly wheel housing as at 47 (see Figure 6) and this shaft is adapted to be swung about its axis by an operating handle 48, arranged externally of the fly wheel housing.

It will be apparent however, that any suitable means may be provided for swinging the shaft 46, and such means may be made accessible from any desired point. A pair of depending arms 49 are secured to the shaft 46 and are provided with inwardly projecting pins 50 arranged in the groove 45 whereby it will be obvious that the swinging of the shaft 46 is adapted to move the ring 44 forwardly and rearwardly. The rear ends of the rods 43 project through a clutch member 51 and nuts 52 are arranged on the rear ends of the rods. A shaft section 53 projects rearwardly from the crank shaft 36, and may be formed integral therewith. The shaft 53 projects through the clutch member 51 and the latter is splined to the shaft 53 as at 54. Coil springs 55 may be employed for normally projecting the clutch member 51 rearwardly to normal position, as shown in Figure 3. The rear end of the clutch member 51 is provided with a toothed recess 56, the teeth being in the form of spur gears for a purpose to be described.

Figures 5, 6:
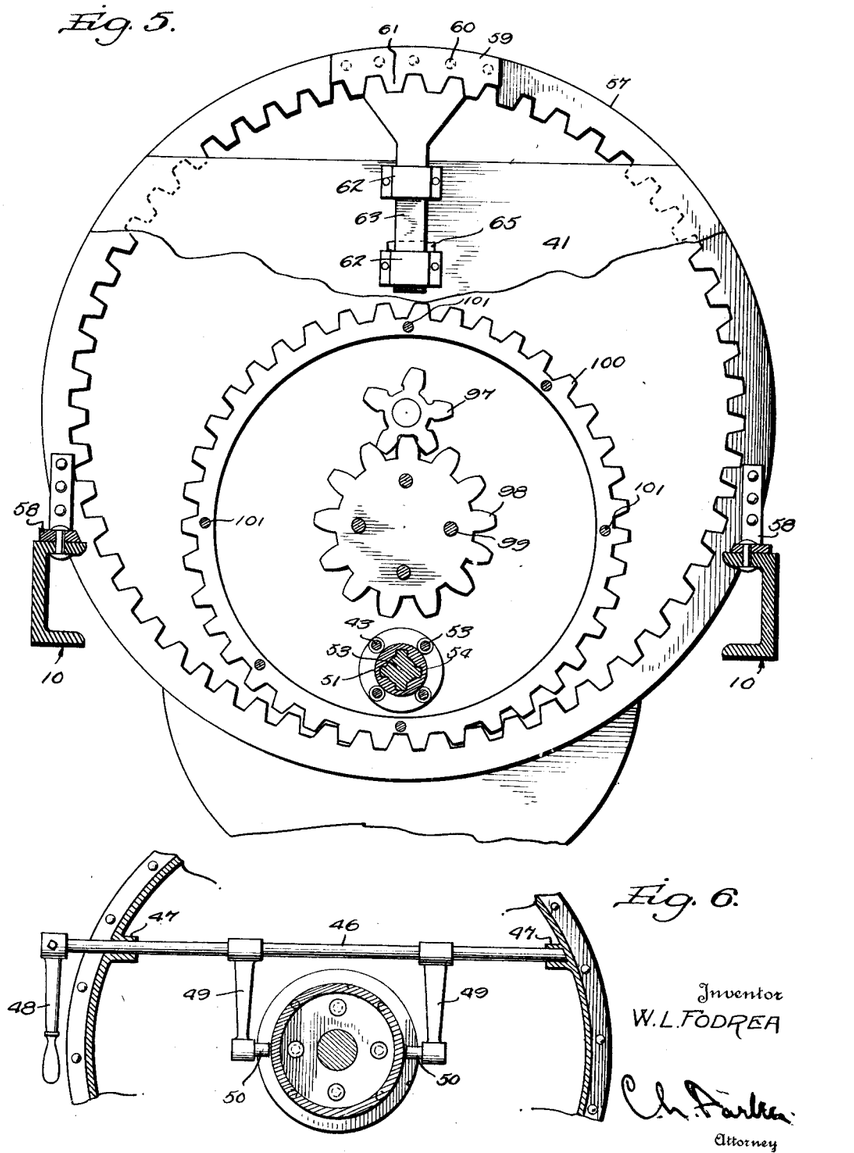

An internal ring gear 57 is arranged rearwardly of the plate 41, as shown in Figures 3 and 5, and this gear is secured to the side frame members 10 by brackets or the like 58. The gear 57 is substantially a duplicate of the forward ring gear 23, being identical in size and coaxial therewith. Means are provided for locking the motor to the ring gear 57 to prevent its rotation during normal driving conditions. As shown in Figures 3 and 5, a lock plate 59 is riveted or otherwise secured against the forward face of the ring gear 57 and is provided with teeth 61. A pair of guides 62 are secured against the forward face of the plate 41 and slidably carry a locking member 63 provided at its upper end with teeth 64 adapted to engage between the teeth 61. The pin 65 is adapted to normally support the locking member in operative position, as shown in Figure 5.

Rearwardly of the clutch member 51, a coacting clutch member 65' is arranged having teeth 66 adapted to engage the teeth 56. The teeth 66 are preferably spur teeth and since the two clutch members are arranged in axial alinement, it will be apparent that the teeth 56 and 66 form a positive driving connection between the clutch elements. The clutch element 65' is provided with a peripheral groove 67 adapted to be engaged by a fork 68 carried by a transverse operating shaft 69 journalled in the side walls of a clutch housing 70. Outwardly of the clutch housing the shaft 69 is secured to a crank 71 by means of which the shaft 69 is made to swing about its axis for a purpose to be described. The free end of the crank 71 is pivotally connected as at 72 with a link 73, and the opposite end of this link is pivotally connected as at 74 with a crank 75 which in turn is secured to a transverse shaft 76 journalled as at 77. A clutch pedal 78 is adapted to operate the shaft 76 and associated elements in the usual manner.

Rearwardly of the groove 67, the clutch element 65' is secured to the clutch plate 79. This plate is provided with a flange 80 having a clutch facing 81 secured thereto and adapted to engage within a coacting clutch member 82. It will be obvious that the elements just described constitute an ordinary cone clutch such as is employed in some types of motor vehicles, and it will be obvious that any suitable type of clutch may be substituted therefor. The clutch member 82 is preferably formed integral with a wheel 83 having a ring gear 84 preferably formed integral therewith and adapted to be engaged by the shaft 85 of a starting motor 86. The wheel 83 is secured to a driven shaft 87 by a nut 88, and the shaft 87 is provided with a reduced portion 89 which projects forwardly through the clutch element 65'. The forward end of the reduced shaft section 89 is provided with a nut 90, and a spring 91 is arranged between this nut and the clutch plate 79, whereby the latter is normally urged rearwardly into operative position. The shaft 87 extends rearwardly into the gear set 15 for connection with the usual gearing contained therein. The latter gearing forms no part of the present invention and need not be described in detail.

Referring to Figures 3 and 4, the numeral 92 designates a vertical plate which may be formed integral with the clutch housing 70. The plate 92, if desired, may be secured as at 93 to the ring gear 57. The plate 92 is provided with a bearing opening 94 to rotatably receive a shaft 95. The rear end of this shaft is journalled in a bearing 96 carried by the clutch housing 70. At its forward end, the shaft 95 is provided with a pinion 97 which is identical with the pinion 30, and is arranged in axial alinement therewith. This pinion is adapted to mesh with a gear 98 secured as at 99 to the plate 41. The gear 98 is similar in diameter to the gear 31 and is arranged in axial alinement therewith. An external ring gear 100 is also secured to the plate 41 as at 101, and the teeth of this gear mesh with the teeth of the ring gear 57.

It will be obvious that the pinion 97 is keyed to the shaft 95 to be driven thereby when the latter is rotated. The housing 70 is provided with an opening 102, as shown in Figure 3. A gear 103 having teeth 104, is splined to the shaft 95 as at 105, and this gear projects into the housing 70. The teeth 104 are adapted to mesh with the teeth 66 of the clutch element 65' in a manner to be described. The gear 103 is provided with a hub having a peripheral groove 106 therein. A fork 107 is adapted to engage within the groove 106 to effect sliding movement of the gear 103. The fork is carried by a shaft 108 journalled in a bearing 109 carried by the housing 70, and the shaft is adapted to be operated by a handle 110. A spring 111 may be arranged between the gear 103 and the plate 92 for normally holding the gear 103 in inoperative position, as shown in Figure 3.

Figure 15:
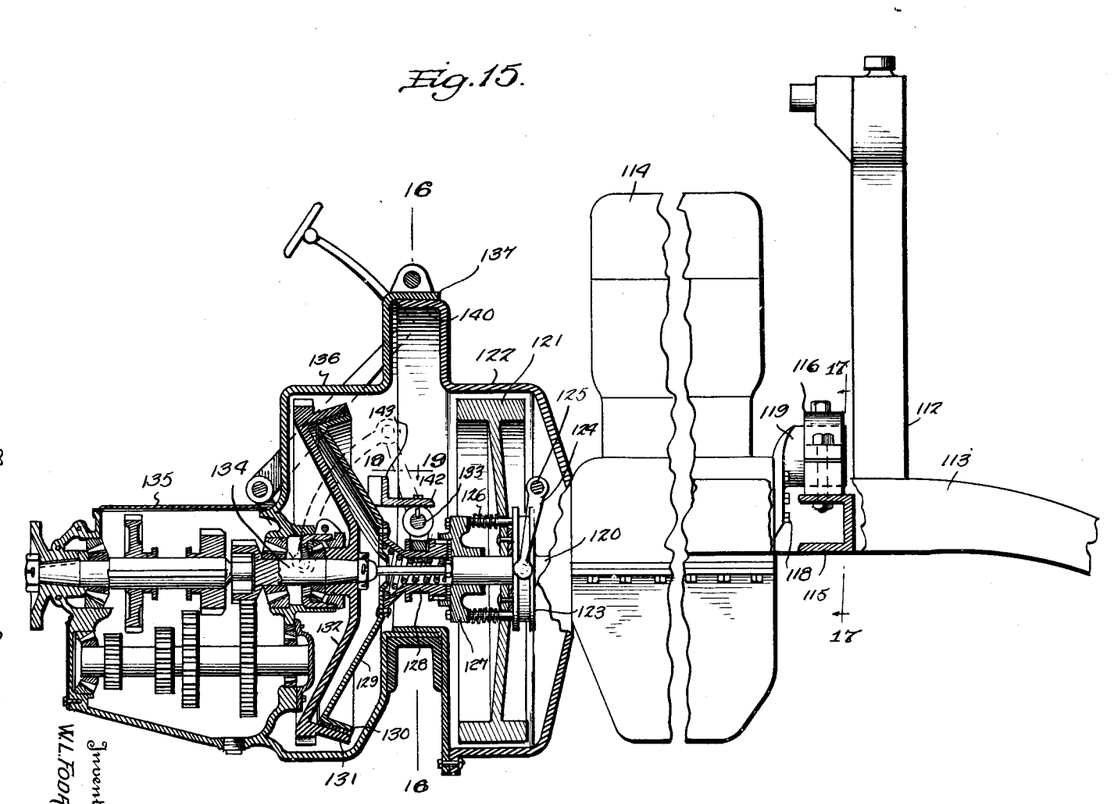
Figure 15 is a central vertical sectional view showing a modified form of the invention.
Figure 16:
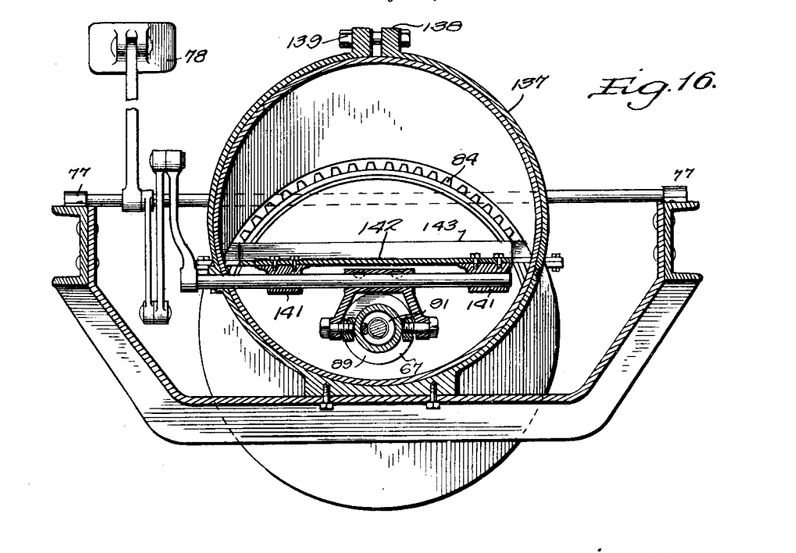
Figure 16 is a section on line 16—16 of Figure 15.

In Figures 15 to 19 of the drawings I have shown a somewhat modified form of the invention adapted for use in connection with motors which may be swung about fixed axes to reverse their positions within vehicle side frames. Referring to Figure 15, the numeral 112 designates an ordinary radiator supported upon vehicle side frames 113 in the usual manner. A motor 114 is arranged between the side frame members and may be provided with the usual water jacket connected to the upper end of the radiator 112 as will be obvious. The motor 114 is preferably of the L-head type the height of which is sufficient to permit the motor to be inverted by swinging it about a fixed axis without elevating the motor during the reversing operation. A cross member 115 is arranged between the side frame members and supports an adjustable bearing 116. A plate 117 is secured by bolts or the like 118 to the forward end of the motor, and this plate is provided with a forwardly extending trunnion 119 arranged in the bearing 116.

The motor 114 is provided with the usual crank shaft 120 and it will be obvious that the trunnion 119 is arranged a substantial distance above the crank shaft. In practice I prefer to arrange the axis of the trunnion 119 substantially midway of the height of the motor for a purpose which will become apparent. In the modified form of the invention, a fly wheel 121 similar to the fly wheel 38, is arranged in a housing 122. A grooved ring 123 surrounds the crank shaft adjacent the fly wheel and is adapted to be moved longitudinally by a fork 124 controlled by a transverse shaft 125. Rods 126 extend through the fly wheel and are slidable therein, these rods being similar to the rods 43, previously described. A clutch member 127 is secured to the rear ends of the rods 126 and is adapted to cooperate with a clutch member 128. The clutch member 128 carries a clutch plate 129 having a conical portion 130 coacting with a conical clutch member 131 carried by a wheel 132. A shaft 133 is adapted to effect longitudinal movement of the clutch element 128, and the clutch member 130 as will be apparent. The wheel 132 is secured to a shaft 134 which extends into the gear set 135, this gear set containing the usual gear shift mechanism. The elements just described correspond to the similar elements of the form of the invention previously described, and need not be described in detail.

The wheel 132 is arranged in a clutch housing 136 and this housing is provided with a circular portion 137 arranged eccentric to the crank shaft of the motor, but concentric to the trunnion 119. The circular portion 137 of the clutch housing constitutes a bearing, under certain conditions, and is provided with a pair of ears 138 adapted to be drawn together by a bolt 139. The fly wheel housing is provided with a coacting circular flange 140 which is concentric to and rotatable within the bearing 137, under certain conditions.

If desired, the shaft 133 may be journalled in bearings 141 carried by a cross bar 142. The rear ends of this bar are offset as at 143 and extend through the side walls of the clutch housing 136 to be secured thereto, as will be apparent.

Figures 17, 18, 19, 20:
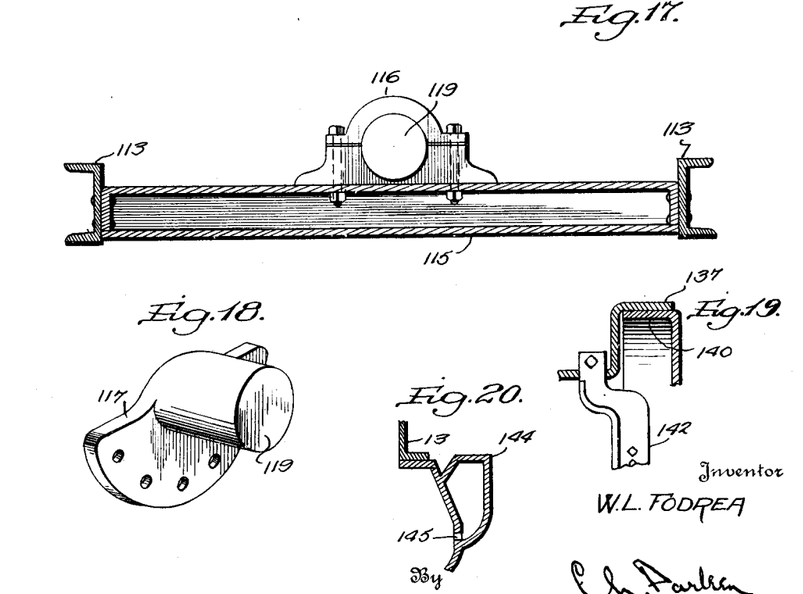
Figure 17 is a similar view on line 17—17 of Figure 15.
Figure 18 is a detail perspective of a motor supporting trunnion.
Figure 19 is a detail sectional view on line 19—19 of Figure 15.
Figure 20 is a detail sectional view of the auxiliary oil container.

In Figure 20 of the drawings I have shown an auxiliary oil container or reservoir 144 which may be formed integral with the motor 13. It will be obvious that the oil reservoir is also adapted for use with the motor 114. As shown, the reservoir 144 communicates with the interior of the crank case of the motor through an opening 145, and this opening is above the normal level of the oil in the crank case.

Figure 7:
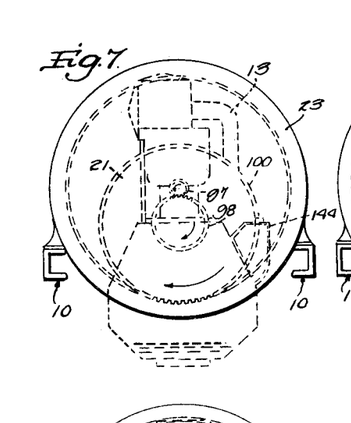
Figure 8:
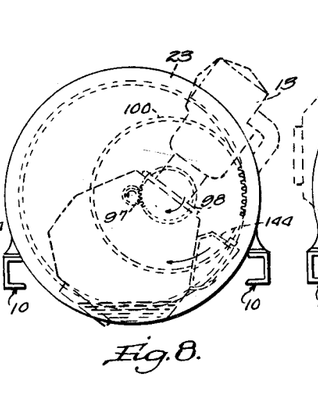
Figure 9:
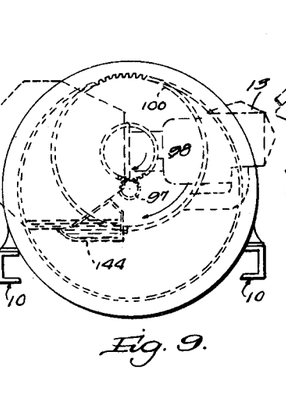
Figure 10:
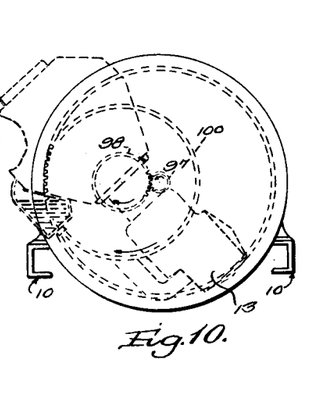
Figures 11, 12:
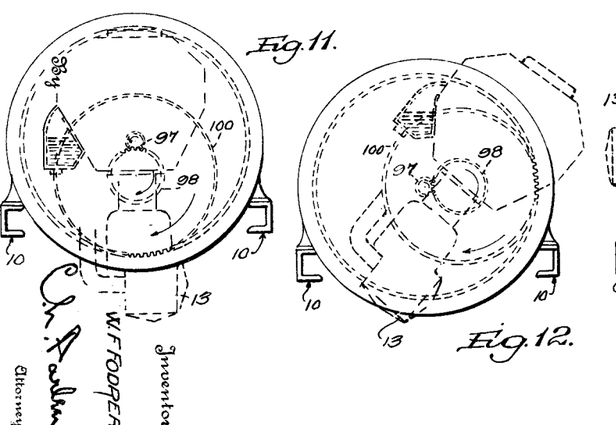
Figure 13:
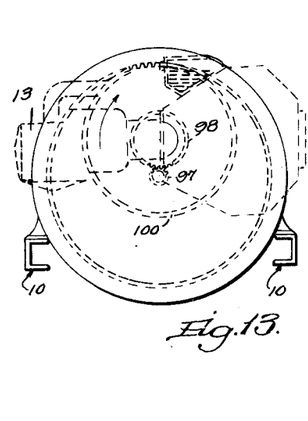
Figure 14:
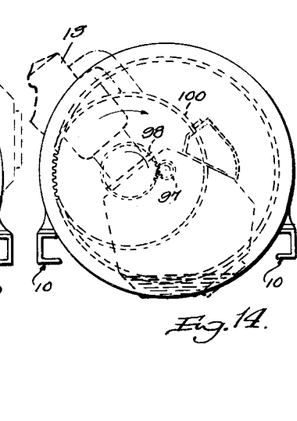

The operation of the device is as follows:
It will be obvious that the locking member 63 prevents any relative rotation between the plate 41 and the ring gear 57, the locking device being held in normal position by the pin 65 with the teeth 64 in engagement with the teeth 61. Thus it will be obvious that the motor under such conditions is adapted for use in driving the vehicle. Rotation of the crank shaft 36 drives the clutch member 54 and this motion is transmitted to the clutch member 65' through the teeth 56 and 66. When the clutch members 79 and 82 are in engagement, and the gear set is in neutral position, the starting motor 86 may be operated to bring the pinion 85 into engagement with the ring gear 84 to rotate the clutch members whereby the motor may be started. The vehicle is then driven in the ordinary manner by operating the clutch pedal 78 and gear shift lever 16. When it is desired to invert the engine to permit work to be done on the crank shaft and associated elements, the shaft 46 is rocked by operating the handle 48. This action moves the collar 44 forwardly, carrying with it the rods 43 and clutch elements 51. Thus it will be apparent that the teeth 56 and 66 will be disengaged from each other and there will be no connection whatever between the two clutch elements 51 and 65'. The gear 103 then may be moved forwardly by operating the handle 110 to bring the teeth 104 into engagement with the teeth 66. The teeth 66 normally form positive clutch teeth, but are preferably formed as spur teeth to permit them to operatively mesh with the teeth 104 when the gear 103 is moved forwardly in the manner described. When this operation has been carried out the starting motor 86 may be operated, this action rotating the ring gear 84. Rotating motion will be transmitted through the main clutch members 83 and 79 to rotate the clutch element 65'. This action drives the gear 103 thus effecting rotation of the pinion 97. Since the position of the pinion 97 is fixed, it will be obvious that rotation thereof causes the gear 98 with which it meshes to travel around the axis of the pinion. The gear 98 and ring gear 100 rotate together since they are both secured to the plate 41. The ring gear 100 meshes with the internal ring gear 57, as shown in Figure 5, and hence it will be apparent that the axis of the ring gear 100 and gear 98 will be caused to travel in a circular path about the axis of the ring gear 57. The normal position of the parts is shown in Figure 7 of the drawings, and the initial action referred to moves the parts to the position shown in Figure 8. During this action it will be apparent that the motor as a whole has been elevated due to the fact that the gear 100 meshes with the ring gear 57 as previously stated. This action also causes the gradual rotation of the gear 100 about its own axis, thereby tilting the motor to the position shown in Figure 8. Continued rotation of the elements referred to causes the crank case of the motor to be lifted clear of the side frames of the vehicle, as shown in Figure 9. When this position is reached, the oil in the crank case will flow through the opening 145 into the reservoir 144 as shown in Figure 9. The reservoir is preferably of such a size as to drain all the oil from the crank case, thus preventing this oil from leaking past the pistons and into the cylinder heads when the motor is further inverted. Continued rotation of the pinion 97 then effects movement of the parts to the successive positions indicated in Figures 10 and 11 whereupon the motor will be inverted. The starting motor 86 is then disconnected from its source of current, and the motor 13 will remain in the position shown in Figure 11. It will be obvious that the crank case then may be removed to permit any desired work to be performed on the crank shaft, connecting rods, main bearings, etc. The crank shaft 36 may be removed by removing the bolt 37, as will be apparent. The gears referred to are preferably so designed that the axis of the ring gear 100 will make a complete revolution around the axis of the ring gear 57 while the motor 13 is being revolved through 180 degrees to the position shown in Figure 11, the center of the motor being again lowered to its original position although the motor is inverted. Thus the motor as a whole will set relatively low in the vehicle frame to permit ready access to the parts thereof. When it is desired to return the motor to its normal position, the action referred to is repeated, the starting motor 86 being employed as the source of power. Continued movement from the position shown in Figure 11 will elevate and tilt the motor to the position shown in Figure 12 to permit the cylinder heads to clear the side frames. The motor is then swung to the position shown in Figure 13, and continued movement from this position permits the motor to assume the position shown in Figure 14. During the latter part of the movement described, oil again will be drained back into the crank case from the auxiliary reservoir 144. When the motor reaches its normal position, the locking member 63 is again raised and the pin 65 inserted. The releasing of the handle 48 permits the springs 55 to project the clutch member 51 rearwardly into operative engagement with the clutch member 61. Releasing of the handle 110 also permits the spring 111 to return the gear 103 to normal position as shown in Figure 3.

While I have described the operation of the apparatus with respect to the gears 97, 98, 100 and 57, it will be obvious that the same operation takes place at the forward end of the motor. The gears 30, 31, 21 and 23 are substantial duplicates of those previously described and their operation is identical therewith. If desired, the inverting of the motor 13 may be accomplished manually by rotating the shaft 28 by means of a suitable crank. This operation is identical with that previously referred to and need not be described in detail.

In the form of the invention shown in Figures 15 to 18 inclusive, the bearing 116 is tightened about the trunnion 119, and the bearing 137 is tightened about the flange 140, by means of the nut 139, to hold the motor 114 in normal position to prevent rotation thereof. When it is desired to invert the motor for the purpose stated, the driving connection between the clutch elements 127 and 128 may be released by operating the shaft 125 to draw the collar 123 and clutch element 127 rearwardly. The nut 139 and the bearing 116 are loosened, whereupon the motor may be manually revolved within the bearings 116 and 137. The modified form of the device is adapted for use in connection with motors of the L-head or other types which are not taller than the width of the space between the side frames 113. Thus it will be apparent that the motor may be inverted and may be clamped in inverted position by tightening the bearings 116 and 137. The motor freely may be swung back to normal position merely by releasing the bearings referred to, these bearings again being tightened after the motor is returned to its normal operative position.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a pair of side frames, a motor arranged in said frame, and means for rotatably supporting the motor in said frame to permit it to be swung to an inverted position, said means being adapted to elevate the motor as it is being inverted.

2. Apparatus of the character described comprising a vehicle frame, a motor arranged in said frame, means for rotatably supporting the motor in said frame to permit it to be swung to an inverted position, said means being adapted to elevate the motor during the initial swinging movement, and means for locking the motor against relative movement with respect to the frame.

3. Apparatus of the character described comprising vehicle side frames, a motor arranged in said frames with its lower end projecting therebelow, geared means for rotatably supporting the motor in said frames, and means for operating said geared means.

4. Apparatus of the character described comprising vehicle side frames, a motor arranged in said frames with its lower end projecting therebelow, and planetary gear means for rotatably supporting the motor in the frames.

5. Apparatus of the character described comprising vehicle side frames, a motor arranged in said frames, a pair of ring gears arranged at opposite ends of said motor and supported by said frames, and means for rotatably supporting said motor within said ring gear, said means including gearing associated with said ring gear to permit the motor to swing to an inverted position.

6. Apparatus of the character described comprising vehicle side frames, a motor arranged between said frames, a pair of ring gears supported by said frames adjacent opposite ends of said motor, means for supporting said motor in said ring gears, said means including gearing associated with said ring gear for swinging said motor to an inverted position, and means for locking said gearing against movement.

7. Apparatus of the character described comprising a vehicle frame, a motor arranged in said frame, transmission means normally connected with said motor, means for disconnecting the motor from said transmission means, and means for rotatably supporting said motor in said frame to permit it to swing to an inverted position.

8. Apparatus of the character described comprising a vehicle frame, a motor arranged in said frame, transmission means normally connected to said motor, means for disconnecting the motor from said transmission means, means for rotatably supporting said motor in said frame, and a lock for preventing rotation of said motor.

9. Apparatus of the character described comprising a vehicle frame, a motor arranged in said frame, a ring gear arranged adjacent each end of said motor and supported by said frame, a second ring gear meshing with each of said first named ring gears, a spur gear, said last named gear and said second named ring gears being rigidly connected to said motor, and a pinion for rotating said spur gear.

10. Apparatus of the character described comprising a vehicle frame, a pair of ring gears supported by said frame, a pair of smaller gears meshing with said ring gears, a motor arranged between said smaller gears and rigidly connected thereto, and means for rotating said motor.

11. Apparatus of the character described comprising a vehicle frame, a pair of ring gears supported by said frame, said ring gears being provided with internal teeth, a second pair of smaller external ring gears meshing with said internal ring gears, a motor arranged between said second named ring gears and rigidly secured thereto, a gear secured to said motor, a pinion meshing with said last named gear, and means for rotating said pinion.

12. Apparatus constructed in accordance with claim 11 provided with transmission means normally connected to said motor, and means for disconnecting said transmission means from the motor.

13. Apparatus constructed in accordance with claim 11 provided with transmission means normally connected to said motor, means for disconnecting said transmission means from the motor, a starting motor adapted to be connected to said transmission means, and means including said transmission means for driving said pinion from said starting motor when said transmission means is disconnected from said first named motor.

14. Apparatus constructed in accordance with claim 11 provided with tranmission means normally connected to said motor, means for disconnecting said transmission means from the motor, and means for locking said motor in selected positions.

15. Apparatus of the character described comprising a vehicle frame, a pair of internal ring gears supported on said frame, an external ring gear meshing with each of said internal ring gears, said external ring gears being arranged eccentrically with respect to and smaller than said internal ring gears, a spur gear arranged concentric with said external ring gears, a motor arranged between said external ring gears, said motor being rigidly connected to said spur gear and said external ring gears, and a pinion mounted concentrically with one of said internal ring gears and meshing with said spur gear.

16. Apparatus constructed in accordance with claim 15 provided with means for rotating said pinion.

17. Apparatus constructed in accordance with claim 15 provided with transmission means normally connected to said motor and means for disconnecting said transmission means from said motor.

18. Apparatus constructed in accordance with claim 15 provided with transmission means normally connected to said motor, means for disconnecting said transmission means from said motor, a starting motor adapted to be connected to said transmission means, and means including said transmission means for driving said pinion from said starting motor when said transmission means is disconnected from said first named motor.

19. Apparatus of the character described comprising a vehicle frame, a motor arranged in said frame and provided with a crank case adapted to contain lubricant, means for supporting said motor in said frame to permit it to be swung to an inverted position, and an auxiliary oil container communicating with said crank case above the level of the oil therein.

20. Apparatus of the character described comprising a motor, means for supporting said motor to permit it to rotate about a horizontal longitudinal axis, and means for causing said axis to travel in an arc of a circle as said motor rotates thereabout.

In testimony whereof I affix my signature.

WILLIAM L. FODREA.